(12) United States Patent
Gruss et al.

(10) Patent No.: US 8,067,736 B2
(45) Date of Patent: Nov. 29, 2011

(54) ELECTROMAGNETIC RADIATION DETECTOR WITH NANOWIRE THERMOMETER AND METHOD FOR PRODUCING SAME

(75) Inventors: Jean-Antoine Gruss, Seyssinet-Pariset (FR); Jean-Louis Ouvrier-Buffet, Sevrier (FR)

(73) Assignee: Commissariat a l'Energie Atomique, Paris (FR)

( * ) Notice: Subject to any disclaimer, the term of this patent is extended or adjusted under 35 U.S.C. 154(b) by 478 days.

(21) Appl. No.: 12/289,598

(22) Filed: Oct. 30, 2008

(65) Prior Publication Data
US 2009/0121136 A1 May 14, 2009

(30) Foreign Application Priority Data

Nov. 12, 2007 (FR) ...................................... 07 07919

(51) Int. Cl.
*G01J 1/00* (2006.01)
*G01J 5/00* (2006.01)

(52) U.S. Cl. .................................. 250/336.1; 250/338.1
(58) Field of Classification Search ............... 250/336.1, 250/338.1
See application file for complete search history.

(56) References Cited

U.S. PATENT DOCUMENTS

| 6,996,147 | B2 | 2/2006 | Majumdar et al. | |
|---|---|---|---|---|
| 2005/0128788 | A1* | 6/2005 | Segal et al. | 365/151 |
| 2006/0185710 | A1 | 8/2006 | Yang et al. | |
| 2006/0266402 | A1 | 11/2006 | Zhang et al. | |
| 2007/0205364 | A1 | 9/2007 | Ouvrier-Buffet et al. | |
| 2008/0142066 | A1 | 6/2008 | Plissonnier et al. | |
| 2009/0020148 | A1* | 1/2009 | Boukai et al. | 136/201 |
| 2010/0056892 | A1* | 3/2010 | Ben-Barak et al. | 600/354 |

FOREIGN PATENT DOCUMENTS

EP  1 653 205 A1  5/2006

OTHER PUBLICATIONS

Abramson et al., "Fabrication and Characterization of a Nanowire/Polymer-Based Nanocomposite for a Prototype Thermoelectric Device", *Journal of Microeleciromechanical Systems*, vol. 3, No. 3, Jun. 2004, pp. 505-513.

* cited by examiner

*Primary Examiner* — David Porta
*Assistant Examiner* — Mindy Vu
(74) *Attorney, Agent, or Firm* — Oliff & Berridge, PLC

(57) ABSTRACT

The electromagnetic radiation detector comprises at least one membrane suspended above a substrate by at least one nanowire. The nanowire forms a thermoelement comprising an electrically conducting core and external layer, respectively doped of different types and insulated form one another by an electrical insulation layer. When the substrate and membrane are at different temperatures, the nanowires constitutes a thermometer providing measurement signals, by Seebeck effect, representative of heating the membrane.

15 Claims, 5 Drawing Sheets

ELECTROMAGNETIC RADIATION DETECTOR WITH NANOWIRE THERMOMETER AND METHOD FOR PRODUCING SAME

BACKGROUND OF THE INVENTION

The invention relates to an electromagnetic radiation detector comprising at least one radiation absorption membrane able to absorb electromagnetic radiation, to transform the radiation into heat and to transmit this heat to a thermometer, said membrane being suspended above a substrate by at least one nanowire substantially perpendicular to the substrate.

STATE OF THE ART

Electromagnetic radiation detectors comprises a sensitive element able to be heated by electromagnetic radiation. The temperature increase of the sensitive element gives rise to electrical charges occurring by pyroelectric effect. Operation of this type of detector with good performance requires three main conditions to be met as far as the sensitive element is concerned: a low calorific mass, a good thermal insulation of the sensitive element from its support, and a large sensitivity of the heat rise conversion effect into an electrical signal. This type of detector conventionally comprises a sensitive element absorbing electromagnetic radiation, suspended above a support substrate. The absorption means are fixed to the substrate by means of an anchoring point.

As illustrated in FIG. 1, a bolometric detector conventionally comprises an absorption membrane 1 suspended above a substrate 2 and comprising an absorption layer of the electromagnetic radiation inducing heating of this same layer, which transfers the temperature thereby accumulated to a thermometer 4 made from bolometric material. The membrane is suspended above the substrate by pillars 3. Thermal insulation of the membrane from substrate 2 is performed by relatively narrow insulating arms, with pillars 3 being arranged at the ends of these arms.

The document EP-A-1653205 describes a bolometric detector wherein pillars 3 can be made from nanowires or nanotubes able to have a diameter of about 10 Å.

The article "Fabrication and characterization of a nanowire/Polymer-Based Nanocomposite for a Prototype Thermoelectric Device", published in "Journal of microelectromechanical systems" Vol. 13 No. 3, June 2004, p. 505-513, describes the use of an array of silicon nanowires to form a thermoelement. As illustrated in FIG. 2, this thermoelement comprises a substrate 2 whereon p-doped or n-doped nanowires 5 are fabricated substantially perpendicularly to substrate 2. Substrate 2 is a semiconductor (for example silicon) doped in complementary manner to the nanowires, i.e. p-doped if the nanowires are n-doped and vice versa. Nanowires 5 are then embedded in a polymer 6, preferably parylene. Nanowires 5 are in contact with both substrate 2 at their base, and with a metallic layer 7 at their free end. To ensure electrical contact between the ends of nanowires 5 and metallic layer 7, polymer layer 6 is etched so as to leave the ends of nanowires 5 apparent, and metallic layer 7 is then deposited. When such a thermoelement is subjected to a temperature gradient, the temperature difference between substrate 2 and metallic layer 7 generates a Seebeck voltage which varies in known manner as a function of the temperature gradient. Although a thermoelement comprising p-doped silicon nanowires 5 and an n-doped silicon substrate 2 presents thermoelectric properties, these properties can be improved by serial connection of at least two components according to FIG. 2, alternately comprising arrays of p-doped and n-doped nanowires 5.

OBJECT OF THE INVENTION

It is one object of the invention to provide an electromagnetic radiation detector, in particular of bolometer type, that presents good performances and is easy to fabricate.

This object is achieved by the fact that the thermometer is formed by a thermoelement in contact with the membrane and the substrate and comprising at least said nanowire, each nanowire comprising a core and an external layer electrically insulated from one another at their periphery by an electrical insulation layer, the core and the external layer being electrically connected to the end of the nanowire, this end being in thermal contact with the membrane.

It is a further object of the invention to provide a method for producing a detector successively comprising:
 formation of electrical connection pads at the level of the substrate,
 deposition of a droplet of catalyst on each connection pad,
 growth of the nanowires at the location of the droplet of catalyst,
 deposition of an electrical insulation layer on the nanowires and substrate,
 deposition of an electrically conducting external layer on the nanowires and substrate,
 deposition of a polymer resin embedding the nanowires,
 planarization of the structure by chemical mechanical polishing,
 formation of an electrical connection element between the core and the external layer and deposition and patterning of each absorption membrane,
 removal of the polymer resin by chemical etching.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

Figure 1:
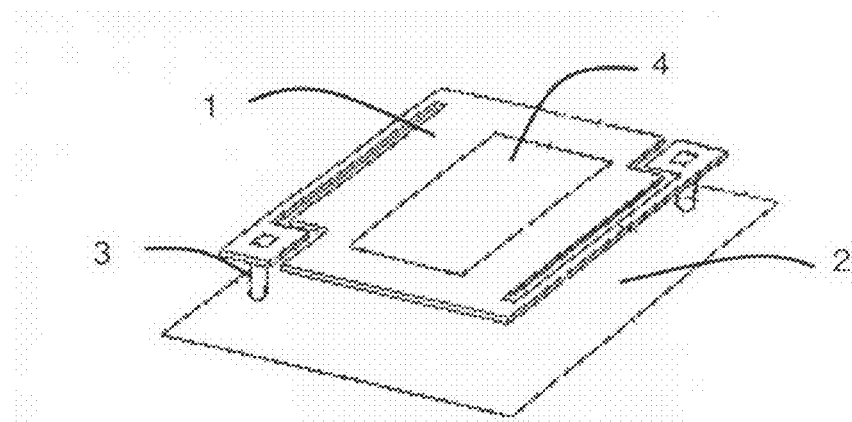
FIG. 1 illustrates a bolometer according to the prior art in perspective view.
Figure 2:
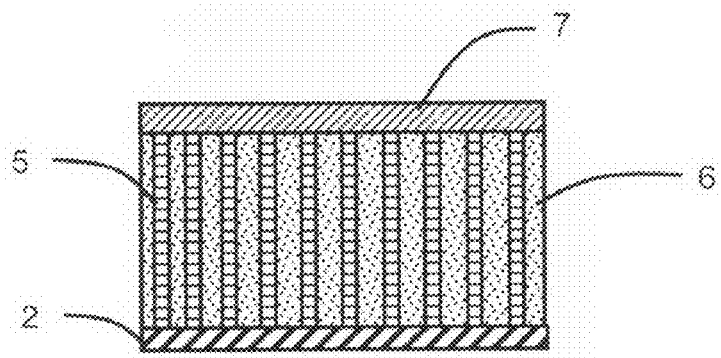
FIGS. 2 and 3 illustrate two thermoelements according to the prior art in cross section.
Figure 3:
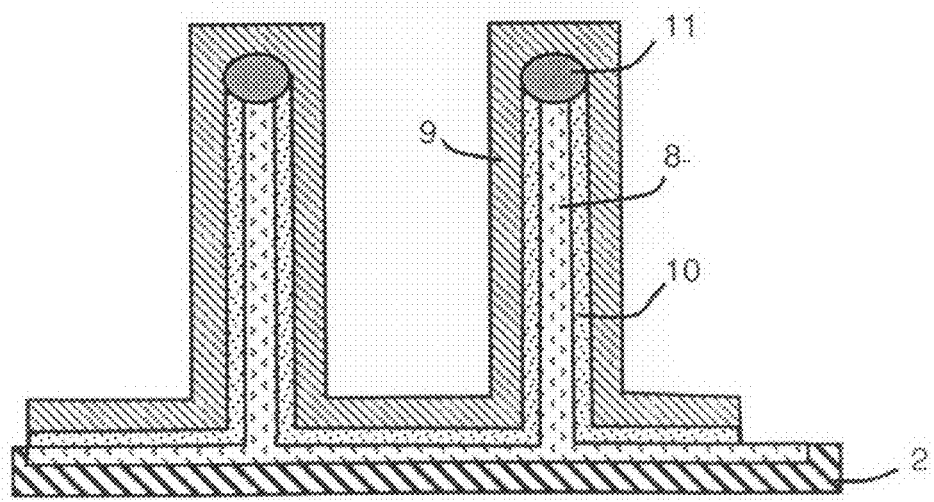

The invention uses a nanowire-based thermoelement of the type described in U.S. patent application Ser. No. 11/826,293, claiming priority from French Patent application no. 0606617 filed on Jul. 20, 2006, to constitute the thermometer of the detector. As illustrated in FIG. 3 each nanowire comprises a core 8 and an external layer 9 electrically insulated at their periphery by an electrical insulation layer 10. Core 8 and external layer 9 are electrically connected at their end by a droplet 11, preferably of gold, that acted as catalyst during the growth step of core 8. In order to generate a current by Seebeck effect, the nanowire is placed in contact with a hot area at one end and with a cold area at the other end. Core 8 and external layer 9 are preferably made from semiconductor material respectively n-doped for one and p-doped for the other or vice versa.

Figure 4:
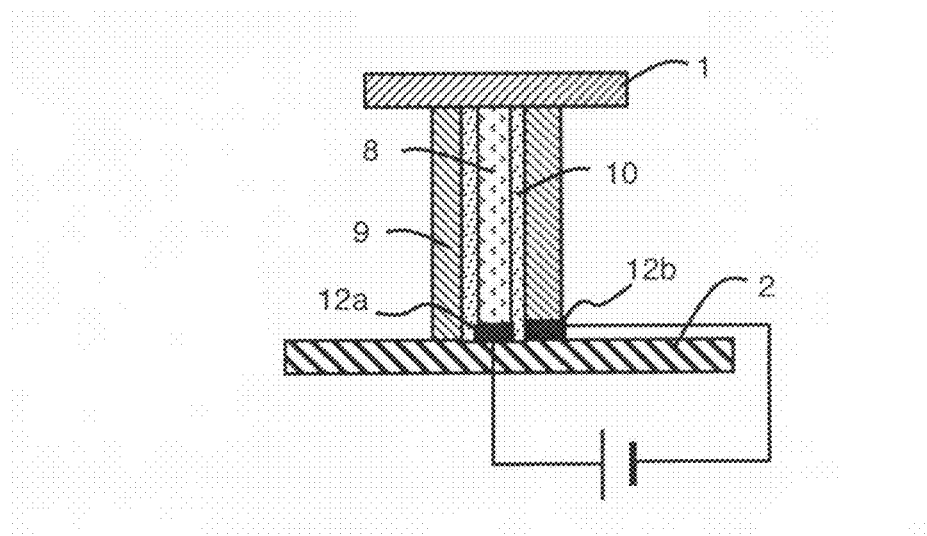
FIG. 4 illustrates a first embodiment of a detector according to the invention in cross section.

According to the embodiment illustrated in FIG. 4, the electromagnetic radiation detector comprises at least one radiation absorption membrane 1 and a thermometer formed by a single associated nanowire which also forms a central support pillar for the membrane. Absorption membrane 1 is suspended above substrate 2 by the nanowire acting as thermometer, in thermal contact with membrane 1 and substrate 2. The nanowire supporting membrane 1 is substantially perpendicular to the substrate. As in FIG. 3, the nanowire comprises a core 8 and an external layer 9 electrically insulated from one another at their periphery by an electrical insulation layer 10. Core 8 and external layer 9 are made from electrically conducting materials and are electrically connected to one another at the end of the nanowire in contact with membrane 1. The electrical connection between core 8 and external layer 9 at the top end of the nanowire can be performed by absorption membrane 1, made of metallic material. At the level of the substrate, core 8 and external layer 9 are preferably respectively connected to connection pads 12a and 12b. For example as illustrated in FIG. 4, connection pad 12a formed at the base of core 8 is connected to a positive pole of a power supply, whereas connection pad 12b in contact with external layer 9 at the level of the substrate is connected to a negative pole of a power supply.

The absorption membrane heats due to the effect of the electromagnetic radiation. The nanowire is in contact, at its base, with substrate 2 heated to a temperature T1, and at its top end with membrane 1 heated to a temperature T2 by the electromagnetic radiation. The nanowire is therefore subjected to a temperature gradient T1-T2 which generates a current in the nanowire by Seebeck effect. The generated current can thereby be measured by measuring means (not shown) integrated in the substrate, and the intensity of the corresponding electromagnetic radiation be deduced therefrom.

In an alternative embodiment, in the case where the membrane is not sufficiently electrically conducting, electrical connection between core 8 and external layer 9 at the top end of nanowire is achieved by deposition of a metallic layer (not shown) supporting the layer absorbing the electromagnetic radiation. This metallic layer can be made from nickel, titanium, chromium, copper, platinum or any other electrically conducting metal. Absorption membrane 1 or absorption layer is made from a material absorbing the electromagnetic radiation considered. For example in the infrared band, nickel, titanium, chromium, etc. can be used. Absorption membrane 1 can be made from the same material as that used for connection between core 8 and external layer 9 of the nanowire.

Figure 5:
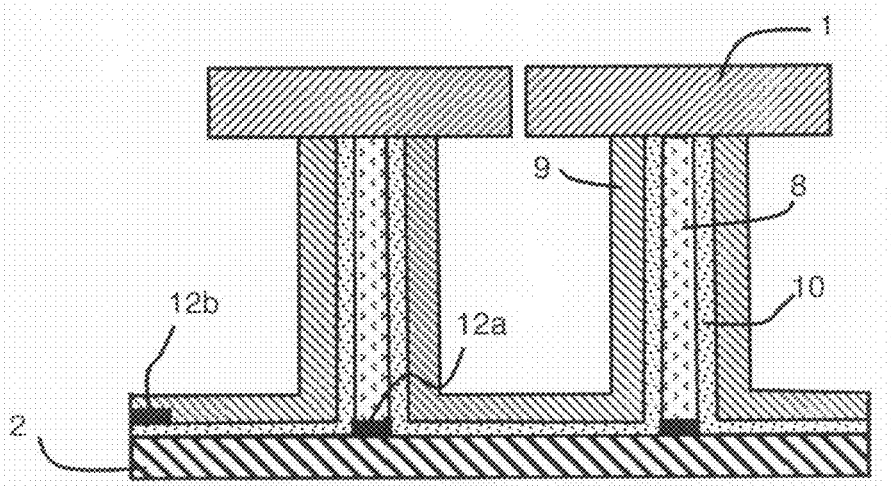
FIG. 5 represents a second embodiment of a detector according to the invention in cross section.
Figure 6:
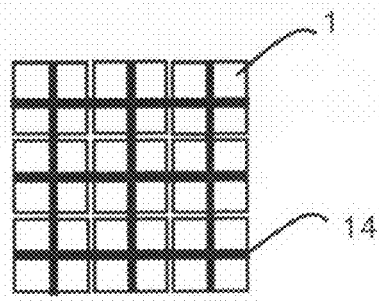
FIG. 6 represents a top view of a detector according to FIG. 5.
Figure 7:
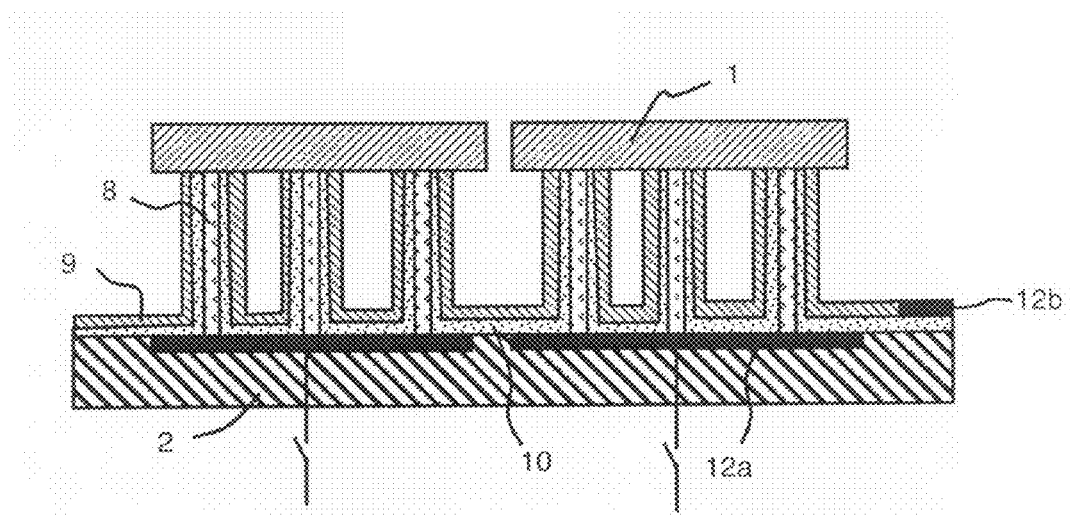
FIG. 7 illustrates another embodiment according to the invention in cross section.
Figure 8:
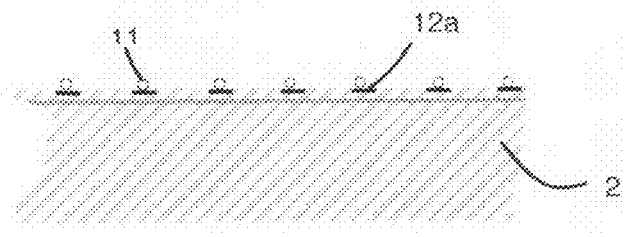
FIGS. 8 to 12 illustrate a method for producing a detector according to the invention.
Figure 9:
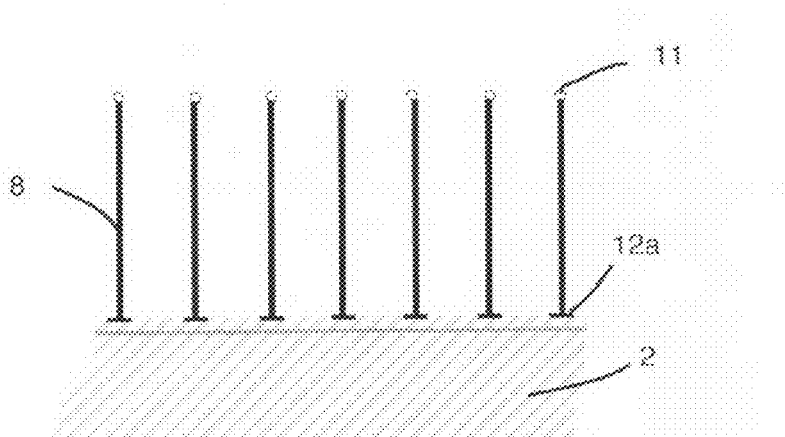
Figure 13:
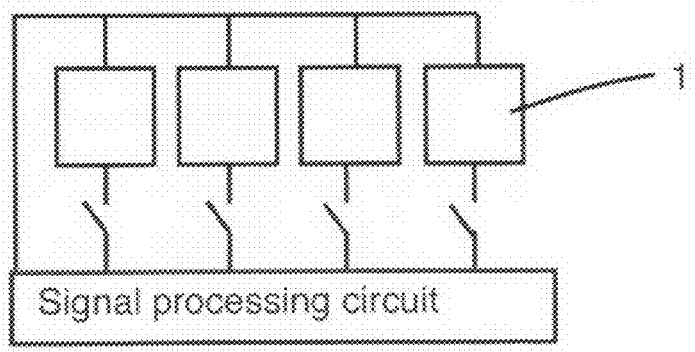
FIG. 13 represents the electrical diagram of a particular embodiment of a thermoelement of a detector of the invention.

According to another embodiment illustrated in FIGS. 5 to 7, a detector preferably comprises several elementary absorption membranes 1, each constituting a measurement pixel and arranged conventionally in the form of a matrix. Each elementary membrane is associated with at least one nanowire forming the thermoelement. Electrical connection of adjacent elementary absorption membranes 1 is illustrated in FIG. 13: each membrane is independent and provides its own signal. To improve the intensity of the signal supplied by each membrane, the reliability and mechanical stability of the detector, it is advantageous to produce several nanowires per membrane, arranged in homogeneous manner and electrically connected in parallel. Thus, as illustrated for example in FIG. 7, each membrane can be supported by three parallel nanowires. Cores 8 of these three nanowires are connected to one and the same connection pad 12a associated with the membrane and integrated in substrate 2 of FIG. 7. External layer 9 connects the different elementary membranes making up the matrix, to a common second connection pad 12b, associated with the detector.

A method for producing a detector comprising several elementary membranes each supported by a central pillar formed by a nanowire and arranged in the form of a bar or a matrix is illustrated in FIGS. 8 to 12.

Figure 10:
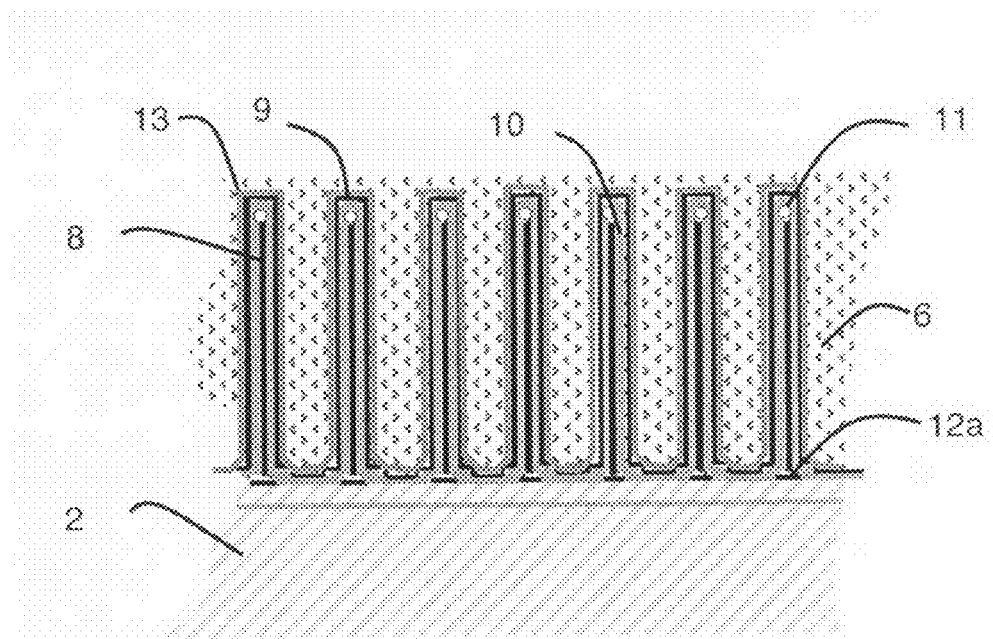

First of all (FIG. 8), connection pads 12a are formed at the level of substrate 2 (for example made of silicon or of SOI type). Then a droplet of catalyst 11, preferably gold, is deposited on each connection pad 12a. A growth step of core 8 of a plurality of nanowires preferably made from doped silicon, is then performed (FIG. 9), by the Vapor-Liquid-Solid (VLS) technique. This technique is particularly well suited to growth of semiconductors and of metal alloys provided that their phase diagrams are perfectly mastered. Wires with a diameter of 10 to 50 nm can be produced by this technique. The latter also enables the composition within the nanowire to be varied by controlling the composition of the vapor phase at the level of the droplet of catalyst. It is possible to fabricate nanowires from either doped or non-doped semiconductor materials (Si, Ge, GaAs, InP, GaN, etc.), as well as metallic nanowires. An electrically insulating layer is then formed, preferably by oxidation or silicon oxide deposition. It covers core 8 of each nanowire, thereby forming insulator 10 of the nanowires and covering substrate 2 between two adjacent nanowires (FIG. 10). External layer 9, made of doped silicon of a second type, is then deposited, for example by chemical vapor deposition (CVD). The set of nanowires are then embedded in a polymer resin 6 (FIG. 10), for example parylene, deposited in vapor phase or by spin-coating. The structure is then planarized by chemical mechanical polishing (FIG. 11) to leave the top end of the nanowires apparent. A metallic layer is then deposited and patterned to achieve elementary absorption membranes 1, which also constitute electrical connection elements between core 8 and external layer 9. Finally, polymer resin 6 is removed, for example by chemical etching (FIG. 12).

In an alternative embodiment, an electrical connection element (not shown) is produced at the end of each nanowire by deposition of an electrically conducting material, after planarization by chemical mechanical polishing, to electrically connect core 8 and external layer 9 of each nanowire. Then a layer is deposited and patterned to achieve elementary absorption membranes 1.

Figure 11:
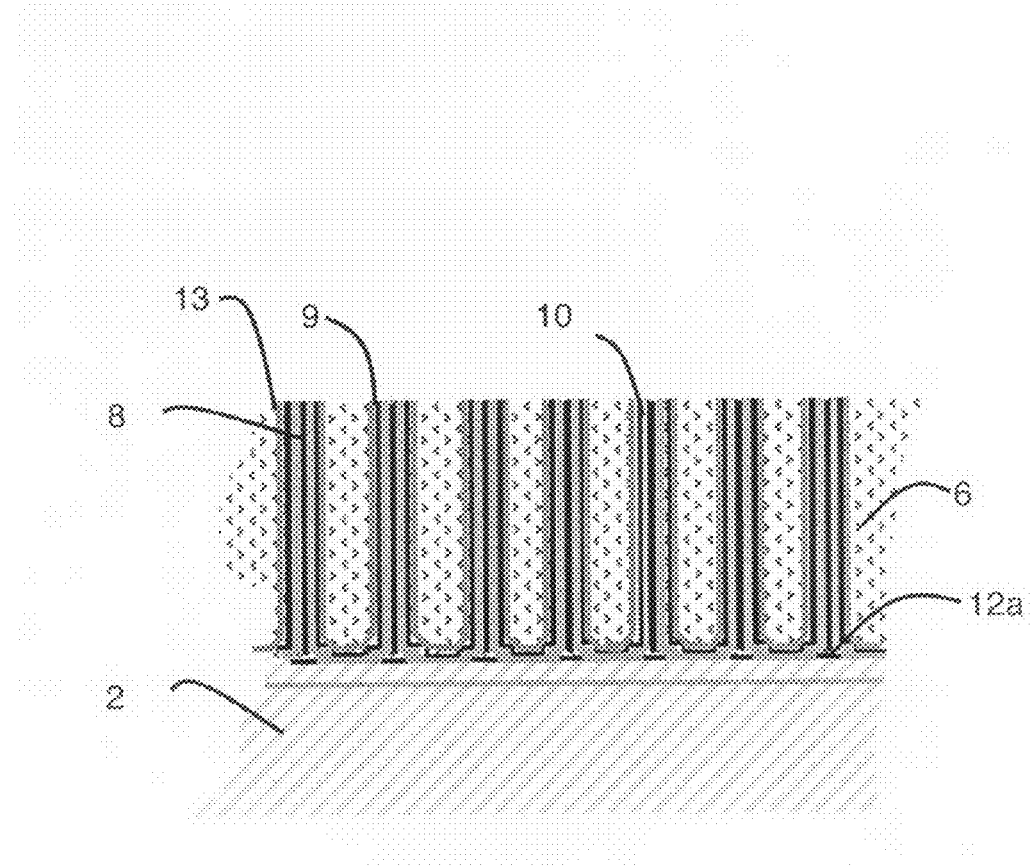
Figure 12:
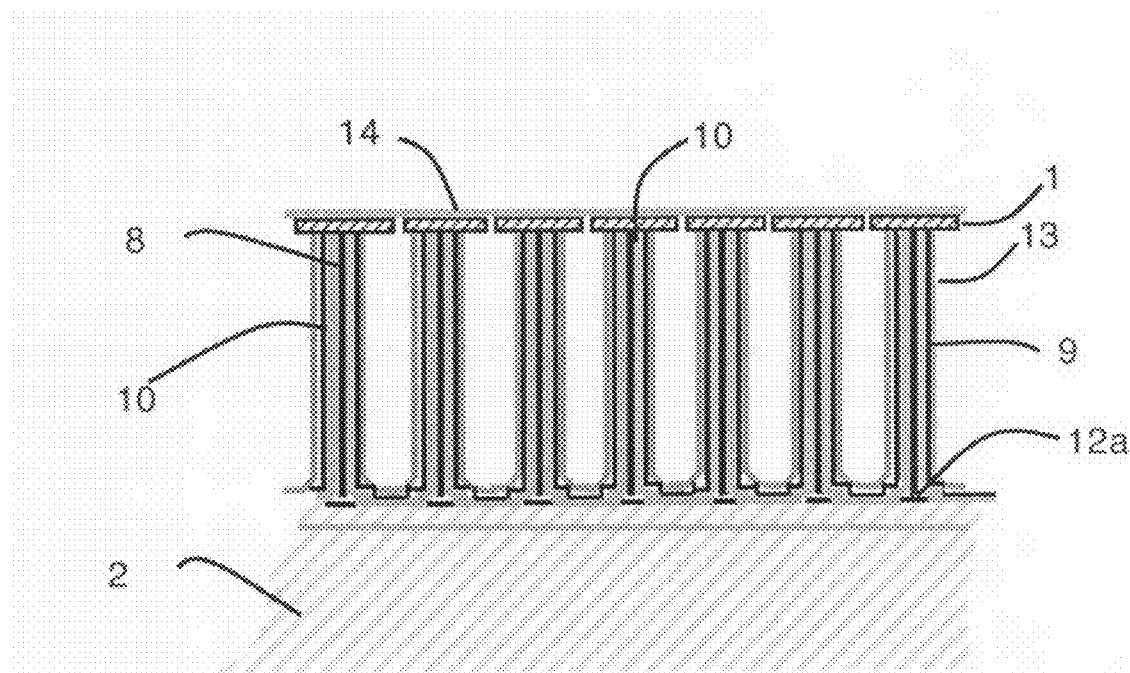

In the particular embodiment illustrated in FIGS. 10 to 12, a mirror layer 13, for example made of aluminum, is deposited on substrate 2 and on the nanowires after deposition of external layer 9. This mirror layer enables the electromagnetic radiation that has not been absorbed by membrane 1 to be reflected back. The mirror layer preferably has a thickness of 5 nm, but can also be comprised between 1 and 100 nm. The distance between the top surface of mirror layer 13 (at substrate level) and the bottom surface of membrane 1 is preferably about a quarter of the electromagnetic radiation wavelength to be measured, so as to achieve a resonant cavity maximizing absorption. In the infrared range, this distance will be about 2.5 µm. Mirror layer 13 can be made from any material having a good reflection coefficient of the electromagnetic radiation involved. For example it can be made from aluminum in the case of an infrared radiation.

In the particular embodiment illustrated in FIGS. 6 and 12, after deposition and patterning of absorption membranes 1, but before removal of polymer resin 6, deposition of a stiffening layer or grid 14 is performed. This layer or grid 14 is made from an electrically insulating material, for example silicon oxide or silicon nitride, and enables the structure formed by elementary absorption membranes 1 to be mechanically strengthened. The thickness of this layer or grid 14 can be comprised between 5 and 100 nm, preferably 10 nm.

Each elementary absorption membrane 1 preferably has a thickness of 50 nm but which can be comprised between 10 and 300 nm. The shape of the membrane will preferably be square, but could also be circular, triangular or polygonal. The typical size of membrane 1 is 10×10 μm, but it can be comprised between 0.1 and 100 μm depending on the wavelength of the electromagnetic radiation to be measured and the required resolution.

The distance between the nanowires can be adjusted to the required value by depositing droplets of catalyst 11 on substrate 2 at specific locations. The distance between two nanowires is about 10,000 nm but can be comprised between 200 and 50,000 nm.

Each nanowire has for example a length of 2.5 microns. Its core 8 is made from conducting material, preferably doped silicon of a first type (for example p-doped), with a diameter of 15 nm. Electrical insulation layer 10, preferably made of $SiO_2$, has for example a thickness of 2 nm. External layer 9 of each nanowire is made of conducting material, preferably silicon of a second type (n-doped) or from metal, with a thickness of 3 nm. The total diameter of the nanowire can be comprised between 10 and 100 nm.

Assuming that the thermal resistance of the nanowire is equivalent to that of a bulk nanowire of the same diameter, and that Fourier's law which assumes a diffusive behaviour of the phonons remains applicable, such a nanowire with a diameter of 25 nm has a thermal conductivity k of about 9.5 W/m.K, i.e. a thermal resistance Rth=L/kS.

L being the length of the nanowire and S the cross section of the heat flux passage within the nanowire, about 540 MK/W. This thermal resistance is much higher than that obtained with suspension arms according to the prior art, which is globally about 50 to 100 MK/W.

In practice, this thermal resistance may be higher. Electrical insulation layer 10, which accounts for about 20% of the heat flux passage, does in fact have a lower thermal conductivity, about 1 W/m.K, than the thermal conductivity involved above. Furthermore, the annular configuration provides an additional phonon diffusion effect at the interfaces. Doped silicon core 8 can further be produced by axial stacking of heterojunctions whose thermal conductivity is reduced by a factor 2 to 3. This type of heterojunction nanowire is for example described in U.S. Pat. No. 6,996,147. Increasing the length of the nanowire would result in a proportional increase of the thermal resistance, but the price to pay would be a cavity mismatch. For example, for a nanowire with a length of 10 microns, the thermal resistance would be multiplied by 4 and would reach a value of 2140 MK/W.

Depending on the radiation wavelength involved, the detector can work both in the close infrared (wavelengths from 0.7 to 5 microns) or medium infrared (from 5 to 30 microns), in the visible (wavelengths comprised between 400 and 700 nm), as well as in the ultraviolet and below (wavelengths comprised between 10 and 400 nm).

To improve the thermal insulation of the membrane, the whole detector can be placed in a vacuum or in a gas at very low pressure, behind a window transparent to the considered radiation.

The detector can also comprise cooling means in order to reduce the thermal noise. The substrate can also be kept at a set temperature by Peltier effect elements to increase the precision and reproducibility of the detector.

The use of a nanowire-based thermoelement as thermometer of the detector enables the electromagnetic radiation to be measured by means of the Seebeck effect. On account of the very low weight of the nanowires at their end, the response time of the thermoelement is reduced and the detector is more sensitive. The small diameter and the relatively large height of the nanowires further enables an excellent thermal insulation to be achieved between membrane 1 and substrate 2. Another advantage of such a detector stems from the fact that the detector itself generates an electric voltage. The electric consumption of the radiation detector is therefore reduced and only the electronic data analysis circuit has to be supplied with power, which is particularly advantageous for systems that have to be autonomous.

The invention claimed is:

1. An electromagnetic radiation detector comprising at least one radiation absorption membrane able to absorb electromagnetic radiation, to transform the radiation into heat and to transmit this heat to a thermometer, said membrane being suspended above a substrate by at least one nanowire substantially perpendicular to the substrate, and a detector, wherein the thermometer is formed by a thermoelement in contact with the membrane and the substrate and comprising at least said nanowire, each nanowire comprising a core and an external layer electrically insulated from one another at their periphery by an electrical insulation layer, the core and the external layer being electrically connected to the end of the nanowire, this end being in thermal contact with the membrane.

2. The detector according to claim 1, wherein the membrane is made of electrically conducting material and electrically connects the core and the external layer.

3. The detector according to claim 1, wherein the membrane is made of metallic material.

4. The detector according to claim 1, wherein the membrane is formed by a metallic layer supporting a layer of material absorbing electromagnetic radiation.

5. The detector according to claim 1, wherein the nanowire supports the membrane in a central area of the membrane.

6. The detector according to claim 1, wherein the thermoelement of the membrane comprises a plurality of nanowires electrically connected in parallel.

7. The detector according to claim 1, wherein the detector comprises means for keeping the substrate at a preset temperature.

8. The detector according to claim 1, wherein a mirror layer is deposited on the substrate and the nanowires.

9. The detector according to claim 8, wherein the mirror layer is made of aluminum.

10. The detector according to claim 1, further comprising a plurality of elementary absorption membranes arranged in a matrix, comprising at least one nanowire associated with each elementary absorption membrane.

11. A method for producing a detector according to claim 1, successively comprising:

formation of electrical connection pads at the level of the substrate, deposition of a droplet of catalyst on each connection pad, growth of the nanowires at the location of the droplet of catalyst, deposition of an electrical insulation layer on the nanowires and substrate, deposition of an electrically conducting external layer on the nanowires and substrate, deposition of a polymer resin embedding the nanowires, planarization of the structure by chemical mechanical polishing, formation of an electrical connection element between the core and the external layer and deposition and patterning of each absorption membrane, removal of the polymer resin by chemical etching.

12. The production method according to claim 11, wherein the membrane is electrically conducting and forms the electrical connection element between the core and the external layer.

13. The production method according to claim 11, wherein the element is achieved by deposition of an electrically conducting material to electrically connect the core and the external layer.

14. The production method according to claim 11, further comprising deposition of a mirror layer after deposition of the electrically conducting external layer and before deposition of a polymer resin embedding the nanowires.

15. The production method according to claim 11, wherein, after deposition and patterning of the absorption membrane and before removal of the polymer resin, it comprises deposition of a stiffening layer or grid made from electrically insulating material.

* * * * *